United States Patent
Sheng et al.

(10) Patent No.: US 10,880,445 B2
(45) Date of Patent: Dec. 29, 2020

(54) MULTI-FUNCTION PERIPHERAL WITH PIVOTAL DISCHARGE TRAY

(71) Applicant: AVISION INC., Hsinchu (TW)

(72) Inventors: Shao-Lan Sheng, Hsinchu (TW); Chin-Chu Chiu, Hsinchu County (TW); Ming-Chih Shih, Yuanlin (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/513,364

(22) Filed: Jul. 16, 2019

(65) Prior Publication Data

US 2020/0084330 A1 Mar. 12, 2020

(30) Foreign Application Priority Data

Sep. 7, 2018 (TW) ............................. 107131452 A

(51) Int. Cl.
*H04N 1/00* (2006.01)
(52) U.S. Cl.
CPC ..... *H04N 1/00535* (2013.01); *H04N 1/00641* (2013.01); *H04N 2201/0094* (2013.01)
(58) Field of Classification Search
CPC ........... H04N 1/00535; H04N 1/00641; H04N 2201/0094; H04N 1/00557; H04N 1/00493; H04N 1/1061; H04N 1/00551; H04N 1/00496; H04N 1/00591; H04N 1/00604; H04N 1/00522
See application file for complete search history.

(56) References Cited

U.S. PATENT DOCUMENTS

| | | | | |
|---|---|---|---|---|
| 5,700,005 | A * | 12/1997 | Chen | B65H 29/14 271/188 |
| 2005/0225623 | A1 | 10/2005 | Hsieh et al. | |
| 2010/0195170 | A1* | 8/2010 | Tomomatsu | H04N 1/0057 358/498 |
| 2012/0045242 | A1* | 2/2012 | Yamada | B41J 13/0036 399/85 |
| 2012/0274994 | A1 | 11/2012 | Westcott | |
| 2015/0304513 | A1* | 10/2015 | Tu | H04N 1/00557 358/1.13 |
| 2020/0024094 | A1* | 1/2020 | Hanamoto | B65H 23/048 |

FOREIGN PATENT DOCUMENTS

| | | |
|---|---|---|
| CN | 101045377 A | 10/2007 |
| CN | 101594444 A | 12/2009 |
| CN | 102957834 A | 12/2009 |
| CN | 102372187 A | 3/2012 |
| CN | 105025185 A | 11/2015 |
| TW | 200533523 A | 10/2005 |

* cited by examiner

*Primary Examiner* — Iriana Cruz
(74) *Attorney, Agent, or Firm* — Muncy, Geissler, Olds & Lowe, P.C.

(57) ABSTRACT

A multi-function peripheral includes: a body; a scanner being disposed on the body and outside the body and performing sheet-fed image acquiring on a document; a discharge tray having a fulcrum about which the discharge tray is pivotally disposed on a lower section of the body lower than and away from the scanner, and can be rotated to a receiving state to receive the document scanned by the scanner; and a printer, which is disposed in the body and electrically connected to scanner, and performs a printing function according to a signal generated after the sheet-fed image acquiring.

20 Claims, 6 Drawing Sheets

MULTI-FUNCTION PERIPHERAL WITH PIVOTAL DISCHARGE TRAY

CROSS-REFERENCE TO RELATED APPLICATIONS

This application claims priority of No. 107131452 filed in Taiwan R.O.C. on Sep. 7, 2018 under 35 USC 119, the entire content of which is hereby incorporated by reference.

BACKGROUND OF THE INVENTION

Field of the Invention

This disclosure relates to a multi-function peripheral, and more particularly to a multi-function peripheral with a pivotal discharge tray.

Description of the Related Art

FIG. 1 is a schematic view showing a conventional sheet-fed scanner 200. The conventional sheet-fed scanner 200 or multi-function peripheral/printer (MFP) having an automatic document feeder (ADF) needs a supply tray 201 to support an original O to be transported, needs feeding rollers 204 and output rollers 205 to transport the original O past a scanning module 203, and further needs a discharge tray 202 to support the original O after being scanned by the scanning module 203. In addition, a scanning module 224 movable in a horizontal direction can scan a document (not shown) covered by a platen cover plate 220. Because a slope of a transporting path 206 from the feeding rollers 204 to the output rollers 205 is not high, and almost approaches a horizontal sate, the discharge tray 202 also needs to be designed according to the transporting path 206 and also presents a state with a low slope. The discharge tray 202 is usually the most projecting portion on the lateral side of the sheet-fed scanner 200 or multi-function peripheral, and tends to encounter collision and damage, so that the machine cannot be easily stored and a larger space is needed for placement of the machine. That is, the footprint of the sheet-fed scanner 200 is relatively large, and the space is wasted.

The above-mentioned discharge tray may be the discharge tray disposed on an output end of the automatic document feeder of the peripheral, or the discharge tray for receiving a data medium printed by a printer module. Either one of the discharge trays projects beyond the lateral side of the automatic document feeder or the multi-function peripheral, so that a new structure is added to the body of the machine. In addition, in order to receive the data media processed by the image acquiring module or the printer module and to stack the data media without damaging or wrinkling the data media, the discharge tray usually has the larger area to support different sizes of data media; and the angle between the discharge tray and the lateral side of the machine body usually ranges from 80° to 85°. When the data medium passes through the output rollers and flies outward, the discharge tray is slightly curved upwards so that the data medium slides downward by gravity after contacting the housing of the discharge tray. Although such the design facilitates the stacking of the media, such the design needs a lot of predetermined space for the placement of the conventional discharge tray of the machine in the era when the space is the money, and cannot satisfy the modern requirement.

BRIEF SUMMARY OF THE INVENTION

It is therefore an object of this disclosure to provide a multi-function peripheral with a pivotal discharge tray, which can be pivotally disposed on a body of the multi-function peripheral, and can be rotated to a receiving state for receiving an original, and can be further rotated to a retracted state. In the retracted state, the discharge tray is more particularly in flat surface contact with a side portion of the body of the multi-function peripheral to form the multi-function peripheral with a completely neat appearance.

To achieve the above-identified object, this disclosure provides a multi-function peripheral including: a body; a scanner being disposed on the body and outside the body and performing sheet-fed image acquiring on a document; a discharge tray having a fulcrum about which the discharge tray is pivotally disposed on a lower section of the body lower than and away from the scanner, and can be rotated to a receiving state to receive the document scanned by the scanner; and a printer, which is disposed in the body and electrically connected to scanner, and performs a printing function according to a signal generated after the sheet-fed image acquiring.

This disclosure further provides a multi-function peripheral including: a body having one side portion; a scanner being disposed on the body and outside the body and performing sheet-fed image acquiring on a document; a discharge tray, which is pivotally disposed on the body, and can be rotated to a receiving state to receive the document scanned by the scanner, wherein in the receiving state, an angle between the discharge tray and the side portion of the body ranges between 15 and 60 degrees; and a printer, which is disposed in the body and electrically connected to the scanner, and performs a printing function according to a signal generated after the sheet-fed image acquiring.

This disclosure further provides a multi-function peripheral including: a body; a scanner, which is disposed on the body and outside the body and performs sheet-fed image acquiring on a document; and a discharge tray pivotally disposed on one side portion of the body, and can be rotated to a receiving state to receive the document scanned by the scanner, wherein the discharge tray can be rotated to a retracted state to be in flat surface contact with the side portion of the body.

Thus, the essence of the embodiment of this disclosure is to provide a multi-function peripheral, which can provide the sheet-fed and flatbed scan functions, and can further use the pivotal discharge tray to receive the scanned original at the high-angle attitude, wherein the discharge tray can be retracted to enter the state where the completely neat appearance is present when the scan function is not being performed. In addition, the steep degree (slope) of the original transporting path is increased, so that the discharge tray may adopt the above-mentioned configuration. That is, the space occupied by the multi-function peripheral is reduced, and the space saving effect is thus obtained. In addition, because the U-shaped transporting passage is not adopted, the discharge tray can be disposed on the side surface of the body. Because the printer is provided in the body, the vertical space essential for the printer can be utilized so that the discharge tray is disposed on the lower section of the body, Thus, when the discharge tray is in the receiving state and the retracted state, the discharge tray cannot occupy too much horizontal extension space, so that the volume of the overall peripheral can be reduced.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
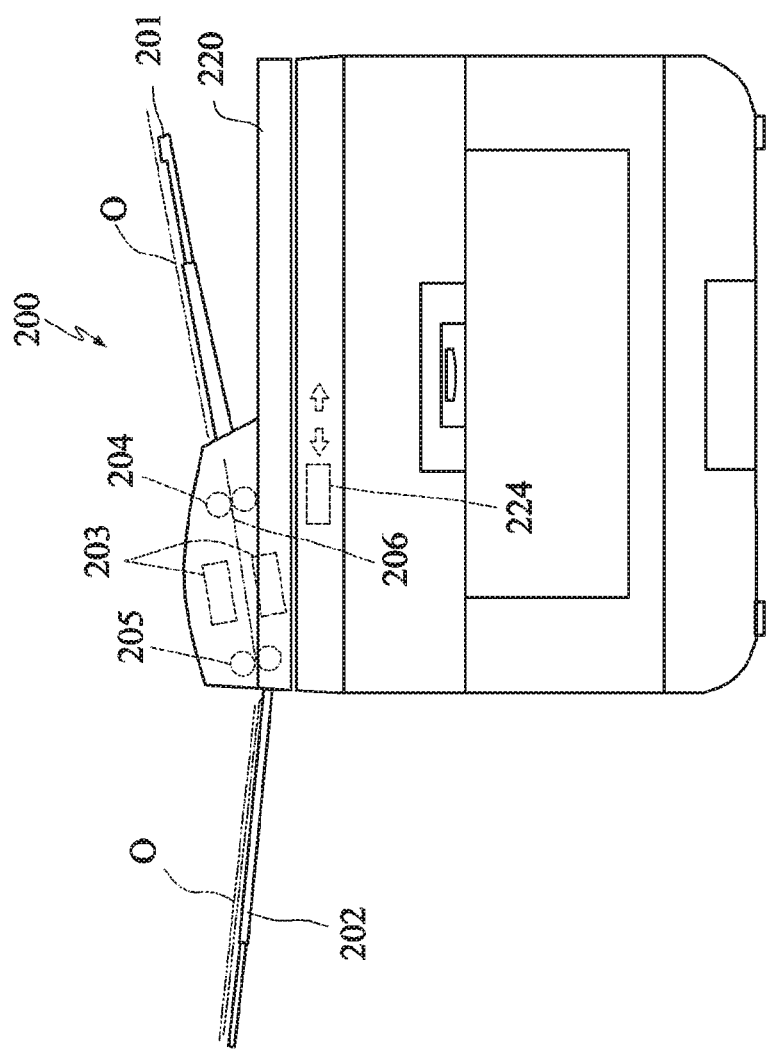
FIG. 1 is a schematic view showing a conventional sheet-fed scanner.
Figure 2:
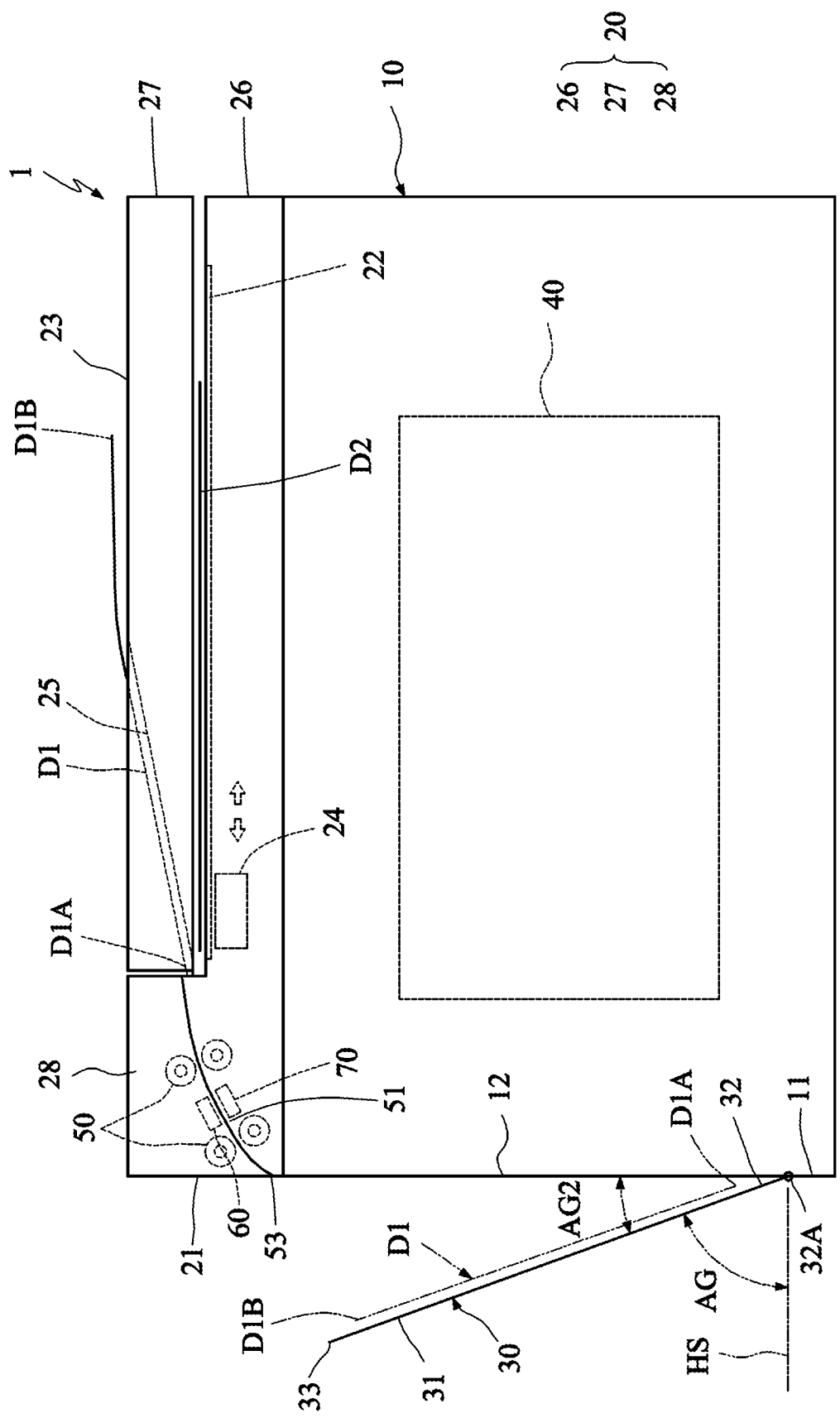
FIGS. 2 and 3 are schematic front views respectively showing closed and opened states of a multi-function peripheral according to a first embodiment of this disclosure invention.
Figure 3:
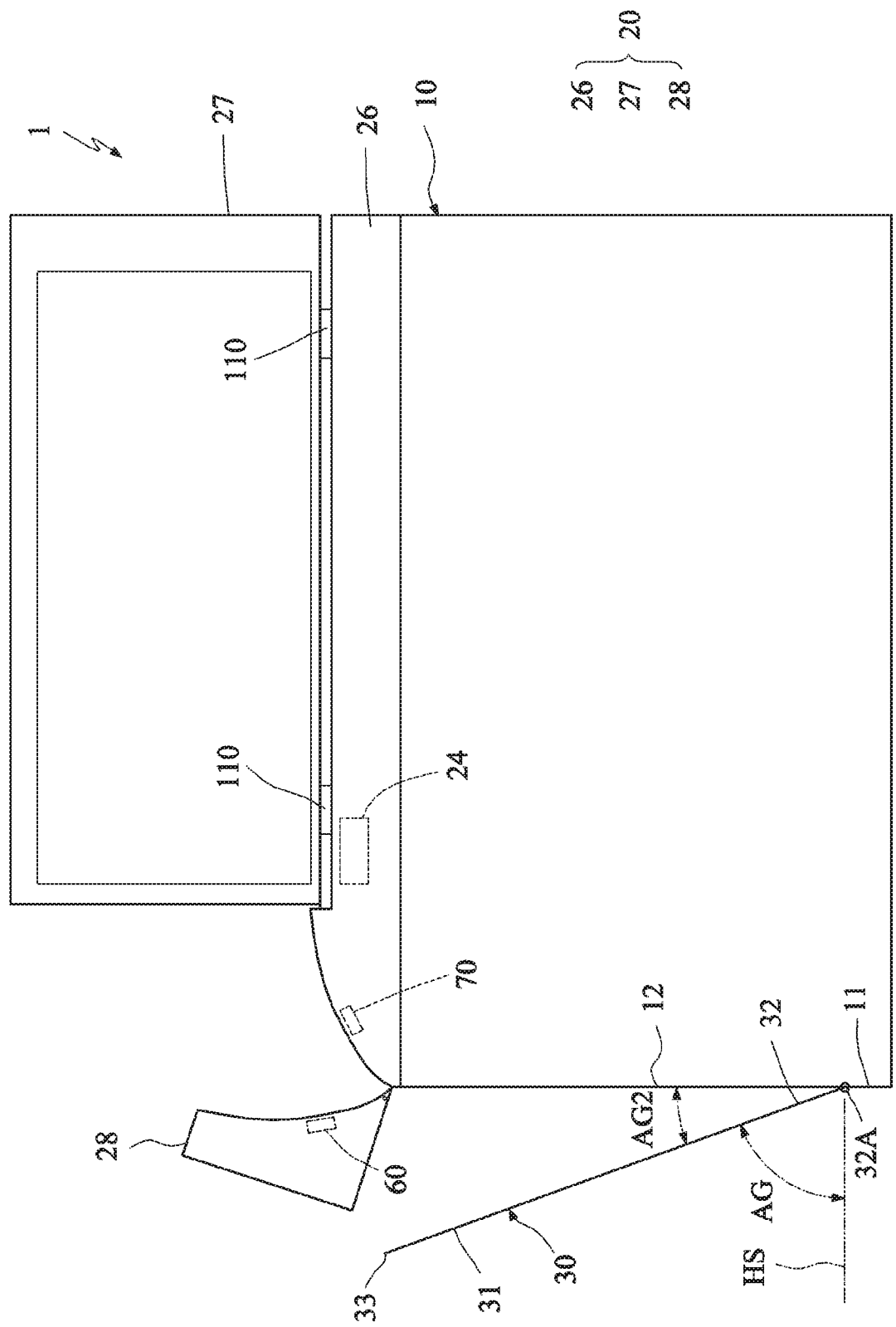
Figure 4:
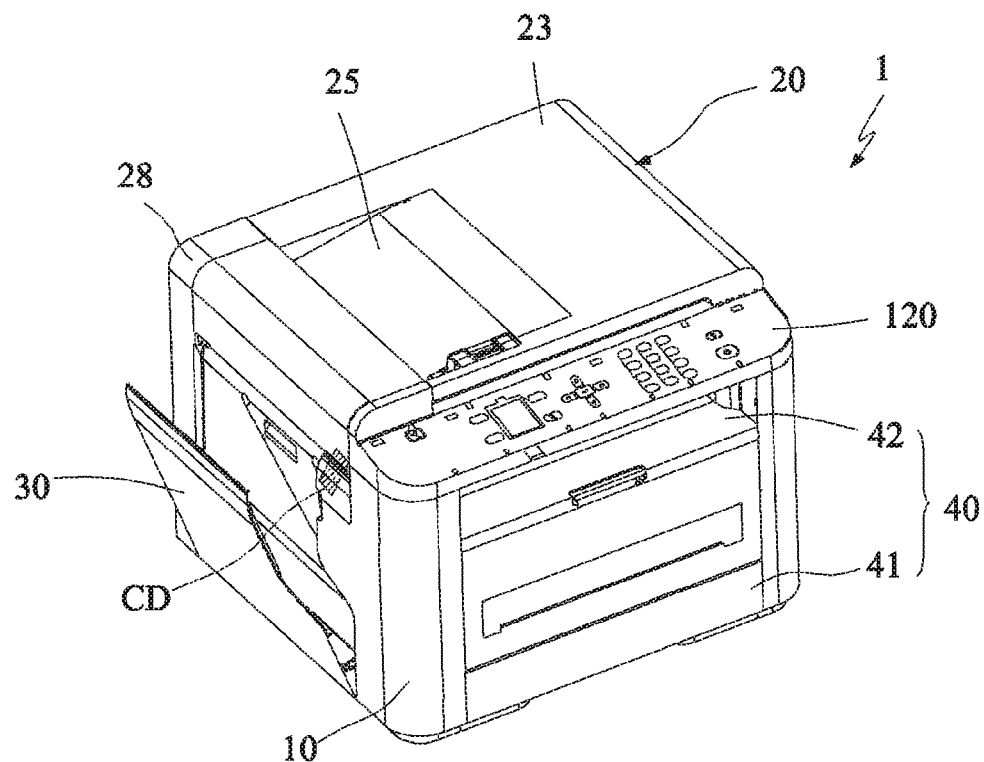
FIGS. 4 and 5 are pictorial views respectively showing a receiving state and a retracted state of a discharge tray of the multi-function peripheral according to the first embodiment of this disclosure invention.
Figure 5:
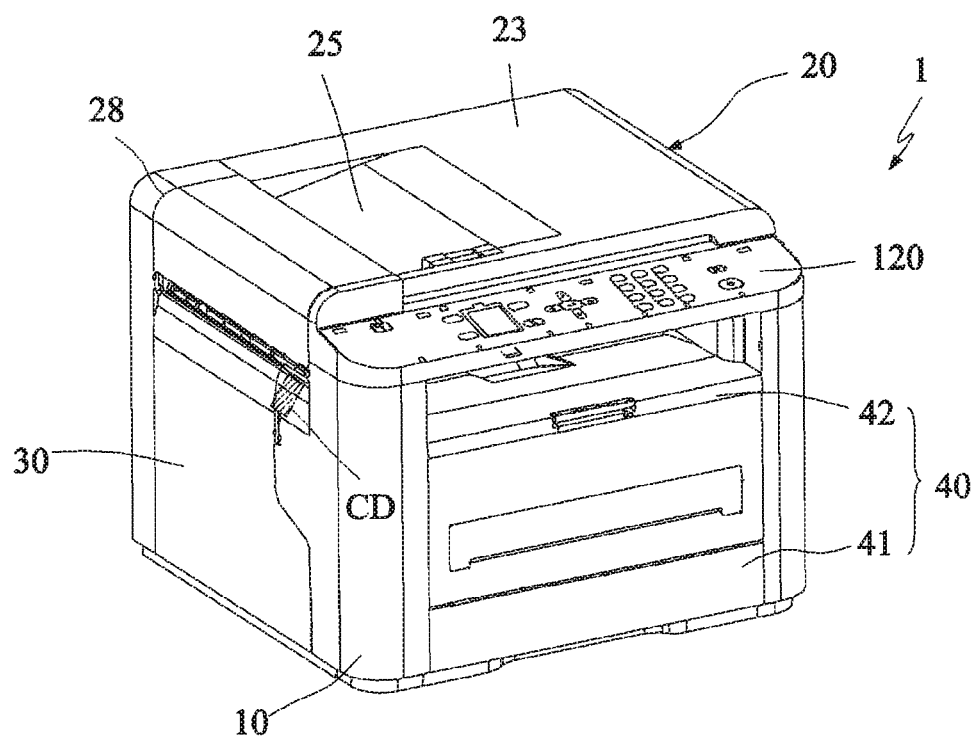
Figure 6:
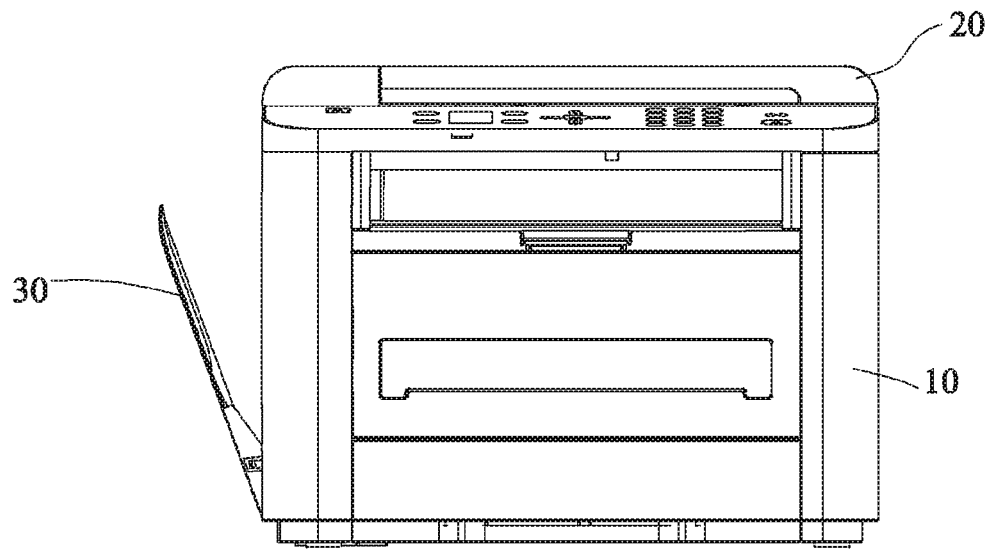
FIG. 6 shows a schematic side view of FIG. 4.

FIGS. 2 and 3 are schematic front views respectively showing closed and opened states of a multi-function peripheral according to a first embodiment of this disclosure invention. FIGS. 4 and 5 are pictorial views respectively showing a receiving state and a retracted state of a discharge tray of the multi-function peripheral according to the first embodiment of this disclosure invention. FIG. 6 shows a schematic side view of FIG. 4. Referring to FIGS. 2 to 6, this embodiment provides a multi-function peripheral 1 including a body 10, a scanner 20, a discharge tray 30 and a printer 40.

In this embodiment, the body 10 provides the flat-bed scanner function and the printer function, and has one side portion 12, which is a vertical surface or vertical side perpendicular to a horizontal direction in this non-limitative example.

The scanner 20 disposed on the body 10 and outside the body 10 performs sheet-fed image acquiring on a first document D1 and is also referred to as a sheet-fed scanner. That is, the scanner 20 acquires an image of the first document D1 when the first document D1 is being transported. In this embodiment, the scanner 20 includes a platen body 26, a first cover 27 and a second cover 28. The first cover 27 pivotally disposed on the platen body 26 has a platen portion 23 and a depressed portion 25. Thus, the first cover 27 is pivotally connected to the platen body 26 through two hinges 110, and can provide the function of covering a flatbed-scanned document and the function of supporting a sheet-fed scanned document. The second cover 28 pivotally disposed on the platen body 26 is separated from the first cover 27 by a gap. The second cover 28 provides the function of transporting the document and the sheet-fed scanning function. In addition, top portions of the first cover 27 and the second cover 28 commonly provide a circumferential flat upper surface to support other articles, such as another multi-function peripheral, a notebook computer, a printer or the like.

In this embodiment, the scanner 20 includes a transporting mechanism 50, a first scan assembly 60, a transparent platen 22 and a second scan assembly 24. The transporting mechanism 50 transports the first document D1 past a transporting passage 51. The transporting passage 51 has the high steep degree (slope), or the outlet of the transporting passage 51 has the high steep degree (slope), so that the first document D1 can be steeply transported to the discharge tray 30 disposed at a level lower than the scanner 20. The first scan assembly 60 acquires a first image of the first document D1 transported past the transporting passage 51. The transparent platen 22 supports a second document D2 and is disposed at a level higher than the discharge tray 30 in both the receiving state and the retracted state. The second scan assembly 24 movably acquires a second image of the second document D2 on the transparent platen 22.

Because the discharge tray 30 directly receives the first document D1 falling from the transporting passage 51, a horizontal level (or height) of an outlet 53 of the transporting passage 51 is higher than a horizontal level of a free side 33 of the discharge tray 30 in the receiving state and the retracted state.

The discharge tray 30 has a fulcrum or pivot 32A, so that the discharge tray 30 is pivotally disposed on a lower section 11 of the body 10 lower than and away from the scanner 20, and can be rotated to a receiving state to receive the first document D1, which is scanned by and falls from the scanner 20. The position of the lower section 11 is lower than the position of the scanner 20, and is close to the bottom of the body 10. In the receiving state, an angle AG between the discharge tray 30 and a horizontal surface HS ranges between 75 and 30 degrees or between 65 and 40 degrees. That is, an angle AG2 between the discharge tray 30 and the side portion 12 of the body 10 ranges between 15 and 60 degrees or between 25 and 50 degrees. When the sheet is outputted at the low speed, such as 15 to 25 pages per minute (ppm) and when the angle AG2 of the discharge tray 30 ranges between 10 and 60 degrees, the data media (sheets or first documents D1) outputted from the outlet 53 can be smoothly stacked with the sheet heads (leading edges) facing rightward (downwards). However, when the angle AG2 is too large, some softer sheets may not stand upright. When the angle AG2 is too large and the sheet output speed is too high, the data media after being transported out still have the inertia and cannot be smoothly controlled to make the sheet heads face rightward or to make the sheet heads face rightward. So, the angle AG2 is preferably configured as ranging between 15 and 60 degrees to control most sheet heads to face rightward in most sheet output states. For example, the angle AG2 is preferably configured as ranging between 25 and 45 degrees at the speed from 25 ppm to 35 ppm. As the speed gets slower, the angle AG2 may get larger. Because the sheet output time is longer, the output data medium has the longer time to extend downward to decrease the angle between the data medium and the discharge tray 30 and the impact force of the data medium on the discharge tray 30, so that the data media can be smoothly stacked with the sheet heads facing rightward. The optimum angle AG2 ranges between 30 and 40 degrees, and the orientations of the sheet heads can be easily controlled at various sheet output speeds.

In this embodiment, the discharge tray 30 is pivotally disposed on the side portion 12 of the body 10, and can be rotated to a receiving state to receive the first document D1 scanned by the scanner 20. In addition, the discharge tray 30 further can be rotated to a retracted state to be in flat surface contact with the side portion 12 of the body 10, so that one side portion 31 (or side surface) of the discharge tray 30 and one side portion 21 (or side surface) of the scanner 20 are disposed on a same plane, thereby achieving the effect of providing a completely neat appearance. Because of the configuration angle of the discharge tray 30, the free side 33 of the discharge tray 30 away from a pivot side 32 of the discharge tray 30 is free from a stopping structure for stopping the first document D1 from moving upwards. In this embodiment, as shown in FIG. 2, a first edge D1A of the first document D1 outputted from the scanner 20 earlier than a second edge D1B of the first document D1 is closer to the pivot side 32 of the discharge tray 30 than the second edge D1B of the first document D1.

The printer 40 disposed in the body 10 and electrically connected to the scanner 20 performs a printing function according to a signal generated by the multi-function peripheral. The printer 40 includes, for example but without limitation to, a laser printer, an ink-jet printer or the like. The printer 40 has: a print medium supply tray 41 for storing media to be printed; and a print medium discharge tray 42 for storing the media after being printed.

The multi-function peripheral 1 may further include a third scan assembly 70 and an operation panel 120. The third scan assembly 70 is disposed in the platen body 26 and opposite the first scan assembly 60. The first scan assembly 60 and the third scan assembly 70 cooperate with each other to scan images on two sides of the first document D1. The operation panel 120 is disposed on the platen body 26, and the user can perform setting and execute operations through the operation panel 120.

Figure 7:
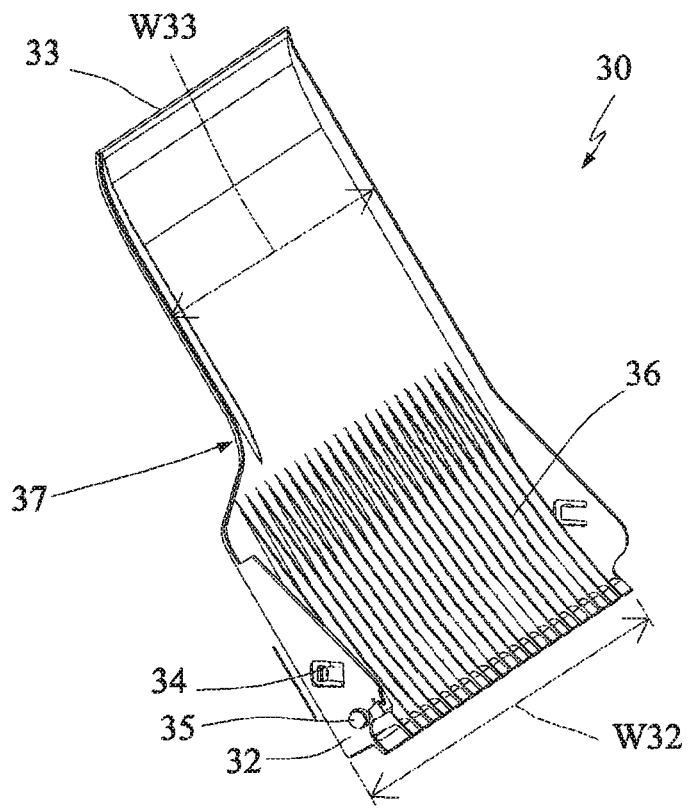
FIG. 7 shows a pictorial view of the discharge tray of FIG. 4.

FIG. 7 shows a pictorial view of the discharge tray of FIG. 4. Referring to FIG. 7, the discharge tray 30 has snaps 34, pivot pins 35 and ribs 36. The snaps 34 snap to the body 10 in the retracted state. The pivot pin 35 is equivalent to the fulcrum 32A of FIG. 2 to provide the pivot function relatively to the body 10. The ribs 36 provide the function of partially support the first document. In this embodiment, the discharge tray 30 can store the documents after being scanned, wherein the size of the document may be smaller than or equal to the A4 size, for example. In addition, the free side 33 of the discharge tray 30 has a notch 37 disposed at an upper left corner of the discharge tray 30, so that the width W33 of the free side 33 is smaller than the width W32 of the pivot side 32. This characteristic enables the following operations. When a card CD, such as a business card or a certificate, is scanned using the scanner 20 in FIGS. 4 and 5, the discharge tray 30 needs not to be opened. In addition, the discharge tray 30 being opened to the receiving state cannot hinder the card CD from being transported out, and cannot hinder the user's hand from pulling out the scanned card CD (e.g., the card CD after being scanned is stilled nipped by the transporting rollers to prevent the card CD from falling). When the discharge tray 30 does not have the notch, the discharge tray 30 opened to the receiving state hinders the user's hand from pulling out the card. Thus, the design of this disclosure also has the special effect.

Figure 8:
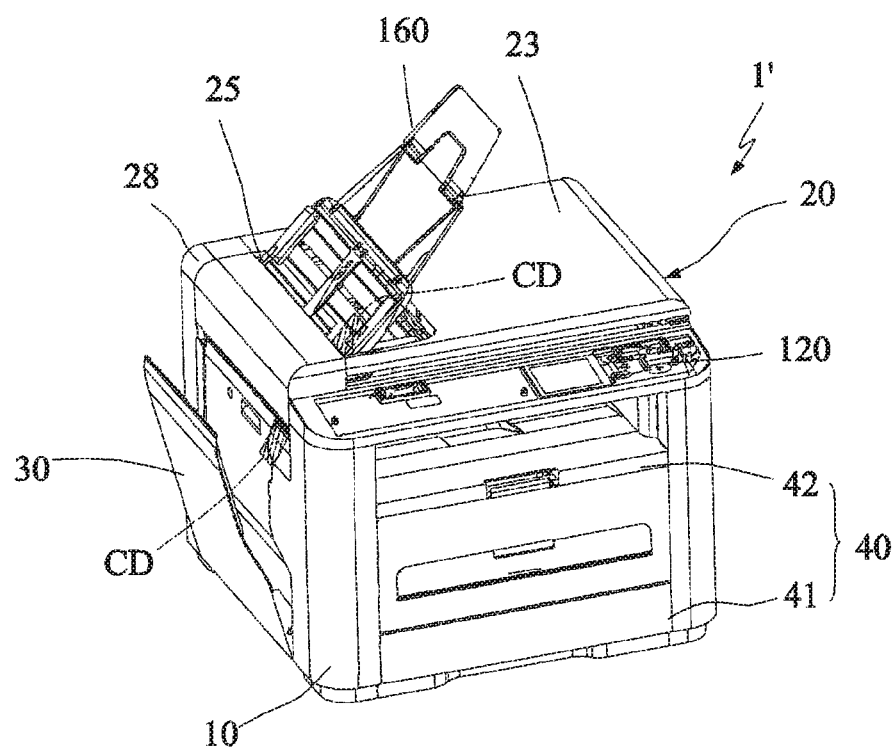
FIGS. 8 and 9 are pictorial views respectively showing a receiving state and a retracted state of a discharge tray of a multi-function peripheral according to a second embodiment of this disclosure.
Figure 9:
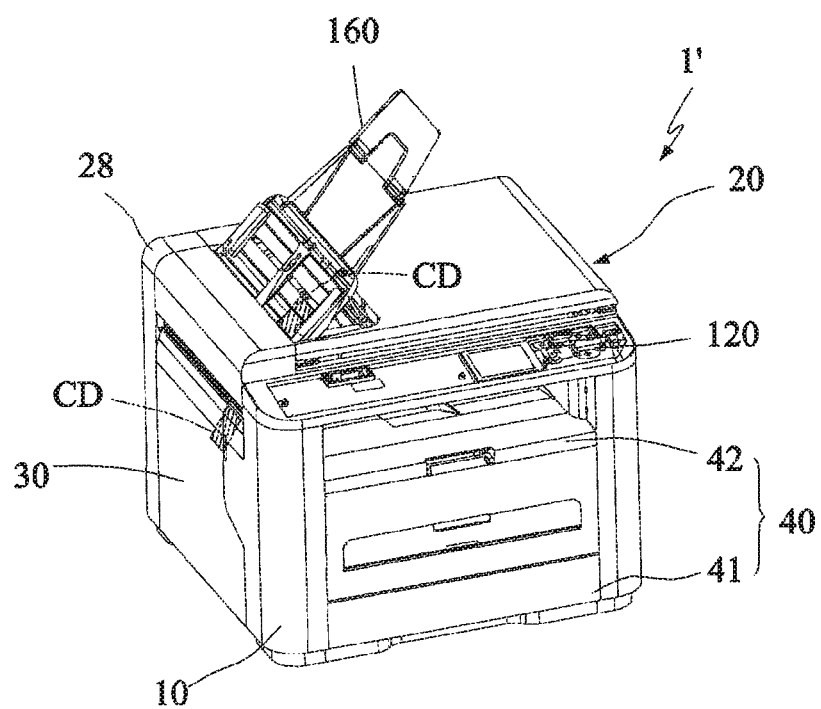

FIGS. 8 and 9 are pictorial views respectively showing a receiving state and a retracted state of a discharge tray of a multi-function peripheral according to a second embodiment of this disclosure. Referring to FIGS. 8 and 9, this embodiment is similar to the first embodiment except for the difference that a multi-function peripheral 1' of this embodiment further includes a document supply tray 160, which is disposed on the depressed portion 25 and supports the first document D1. The document supply tray 160 is rotatably and retractably disposed on the depressed portion 25. It is also obtained that the discharge tray 30 is also applicable to this embodiment.

Thus, the essence of the embodiment of this disclosure is to provide a multi-function peripheral, which can provide the sheet-fed and flatbed scan functions, and can further use the pivotal discharge tray to receive the scanned original at the high-angle attitude, wherein the discharge tray can be retracted to enter the state where the completely neat appearance is present when the scan function is not being performed. In addition, the steep degree (slope) of the original transporting path is increased, so that the space occupied by the multi-function peripheral is reduced, and the space saving effect is thus obtained. In addition, because the U-shaped transporting passage is not adopted, the discharge tray can be disposed on the side surface of the body. Because the printer is provided in the body, the vertical space essential for the printer can be utilized so that the discharge tray is disposed on the lower section of the body, Thus, when the discharge tray is in the receiving state and the retracted state, the discharge tray cannot occupy too much horizontal extension space, so that the volume of the overall peripheral can be reduced. That is, the footprint (footprint) occupied by the overall multi-function peripheral can be reduced. In addition, the downward inclined transporting path is used in the multi-function peripheral, and the types of the originals that can be transported and scanned have the wide range.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A multi-function peripheral, comprising:
   a body;
   a scanner, which is disposed on the body and outside the body and performs sheet-fed image acquiring on a document;
   a discharge tray having a fulcrum, about which the discharge tray is pivotally disposed on a lower section of the body lower than and away from the scanner, wherein the discharge tray can be rotated to a receiving state to receive the document, which is scanned by and falls from the scanner; and
   a printer, which is disposed in the body and electrically connected to the scanner, and performs a printing function according to a signal generated after the sheet-fed image acquiring.

2. The multi-function peripheral according to claim 1, wherein a free side of the discharge tray away from a pivot side of the discharge tray has no stopping structure for stopping the document.

3. The multi-function peripheral according to claim 1, wherein a free side of the discharge tray has a notch.

4. The multi-function peripheral according to claim 1, wherein a width of a free side of the discharge tray is smaller than a width of a pivot side of the discharge tray.

5. The multi-function peripheral according to claim 1, wherein a first edge of the document outputted from the scanner earlier than a second edge of the document is closer to a pivot side of the discharge tray than the second edge of the document.

6. A multi-function peripheral, comprising:
a body having one side portion;
a scanner, which is disposed on the body and outside the body and performs sheet-fed image acquiring on a document;
a discharge tray, which is pivotally disposed on the body and can be rotated to a receiving state to receive the document, which is scanned by and falls from the scanner, wherein in the receiving state, an angle between the discharge tray and the side portion of the body ranges between 15 and 60 degrees; and
a printer, which is disposed in the body and electrically connected to the scanner, and performs a printing function according to a signal generated after the sheet-fed image acquiring.

7. The multi-function peripheral according to claim 6, wherein a free side of the discharge tray away from a pivot side of the discharge tray has no stopping structure for stopping the document.

8. The multi-function peripheral according to claim 6, wherein a free side of the discharge tray has a notch.

9. The multi-function peripheral according to claim 6, wherein a width of a free side of the discharge tray is smaller than a width of a pivot side of the discharge tray.

10. A multi-function peripheral, comprising:
a body;
a scanner, which is disposed on the body and outside the body and performs sheet-fed image acquiring on a document; and
a discharge tray pivotally disposed on one side portion of the body, and can be rotated to a receiving state to receive the document, which is scanned by and falls from the scanner, wherein the discharge tray can be rotated to a retracted state to be in flat surface contact with the side portion of the body.

11. The multi-function peripheral according to claim 10, wherein in the retracted state, one side portion of the discharge tray and one side portion of the scanner are disposed on a same plane.

12. The multi-function peripheral according to claim 10, wherein in the receiving state, an angle between the discharge tray and one side portion of the body ranges between 15 and 60 degrees.

13. The multi-function peripheral according to claim 10, wherein a free side of the discharge tray away from a pivot side of the discharge tray has no stopping structure for stopping the document.

14. The multi-function peripheral according to claim 10, wherein the scanner comprises:
a transporting mechanism transporting the document past a transporting passage; and
a first scan assembly acquiring an image of the document transported past the transporting passage.

15. The multi-function peripheral according to claim 14, wherein the scanner further comprises:
a transparent platen supporting a second document and being disposed at a level higher than the discharge tray in both the receiving state and the retracted state; and
a second scan assembly movably acquiring a second image of the second document disposed on the transparent platen.

16. The multi-function peripheral according to claim 14, wherein a horizontal level of an outlet of the transporting passage is higher than a horizontal level of a free side of the discharge tray in the receiving state and the retracted state.

17. The multi-function peripheral according to claim 10, further comprising a printer, which is disposed in the body and electrically connected to the scanner, and performs a printing function according to a signal generated after the sheet-fed image acquiring.

18. The multi-function peripheral according to claim 10, wherein a free side of the discharge tray has a notch.

19. The multi-function peripheral according to claim 10, wherein a width of a free side of the discharge tray is smaller than a width of a pivot side of the discharge tray.

20. The multi-function peripheral according to claim 10, wherein the discharge tray is disposed at a level lower than the scanner.

* * * * *